Sept. 21, 1943.　　　C. W. CLARK　　　2,329,828
GAUGE TESTING APPARATUS
Filed March 13, 1943　　　3 Sheets-Sheet 1
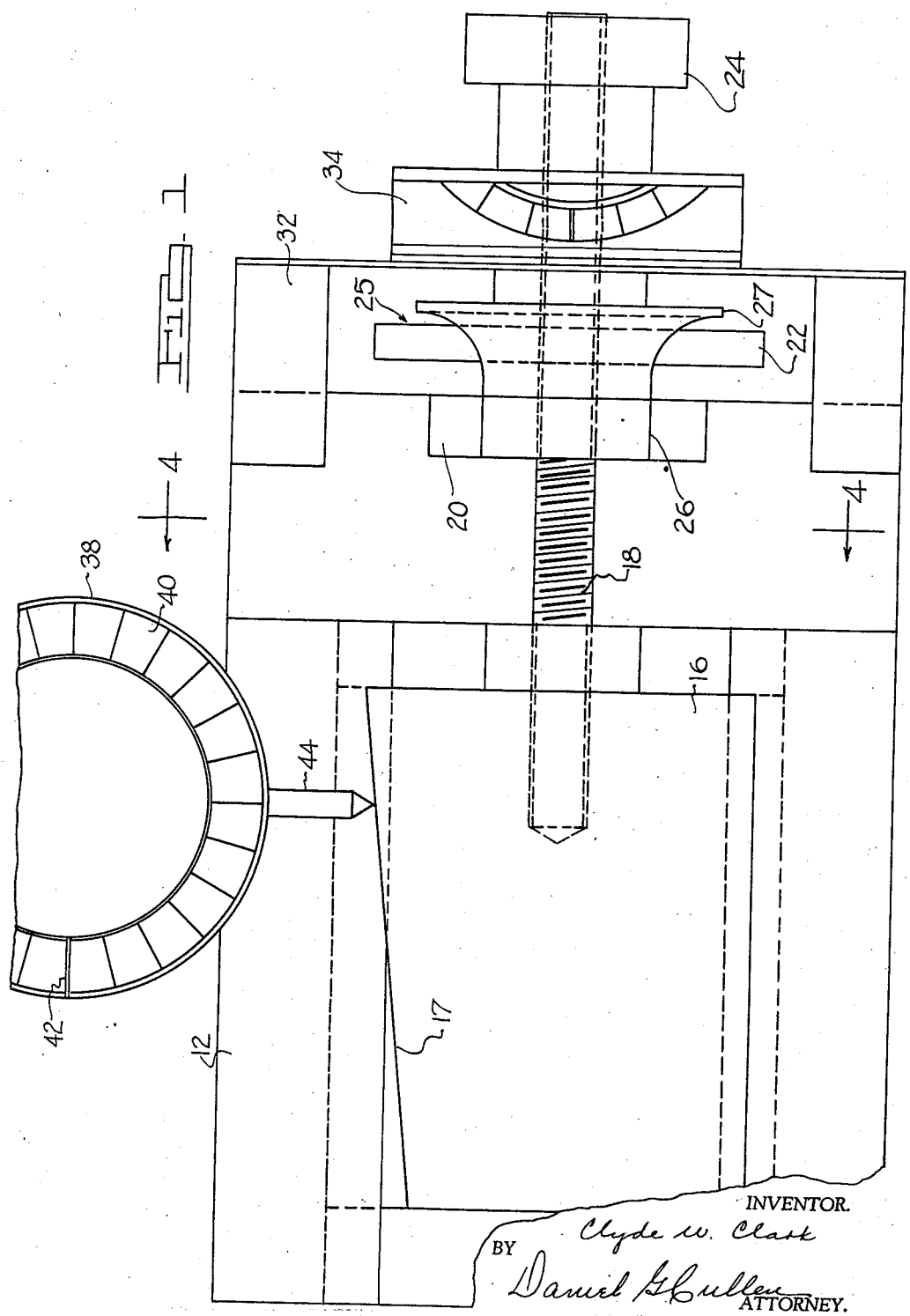
INVENTOR.
Clyde W. Clark
BY
Daniel H. Cullen
ATTORNEY.

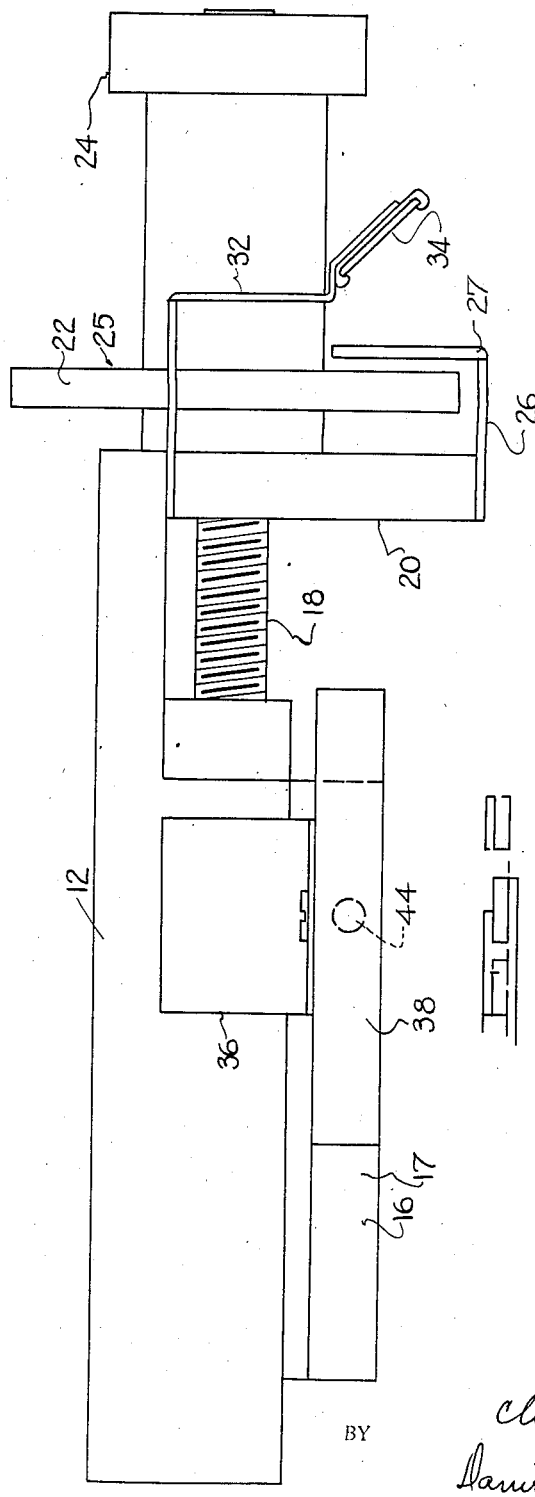

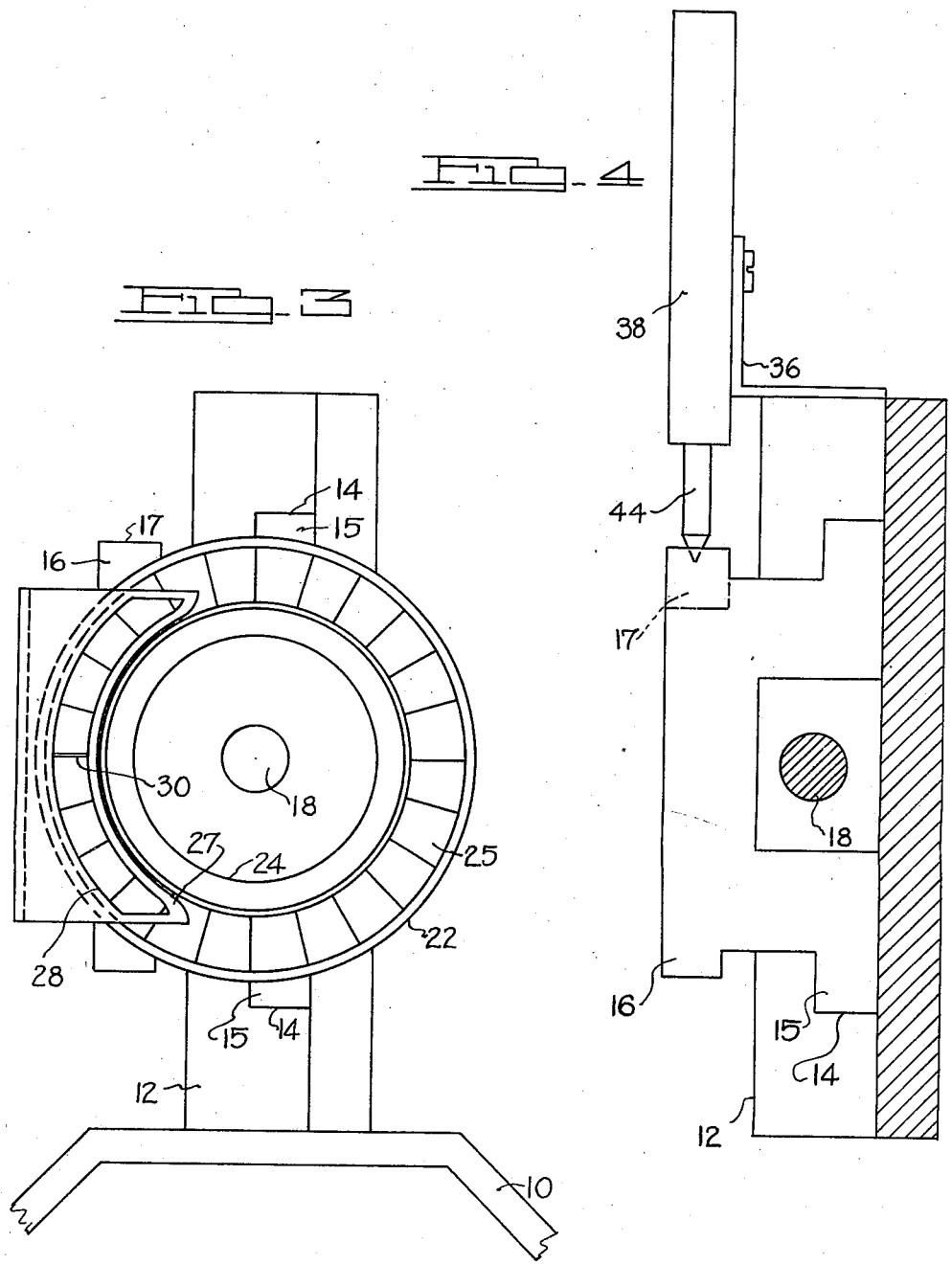

Patented Sept. 21, 1943

2,329,828

UNITED STATES PATENT OFFICE 2,329,828

GAUGE TESTING APPARATUS

Clyde W. Clark, Dearborn, Mich.

Application March 13, 1943, Serial No. 479,068

6 Claims. (Cl. 73—51)

This application relates to comparators. The comparator herein shown is a device that permits an operator to subject an indicator to be tested and a standard indicator to identical forces simultaneously, and to view the indication provided by the two indicators simultaneously for purposes of comparing the indicator to be tested with the standard indicator.

A comparator, according to the invention, is disclosed in the appended drawings.

In these drawings,

Figs. 1 and 2 are front and top elevations respectively.

Fig. 3 is an end view with parts omitted for purposes of clarity.

Fig. 4 is a section on line 4—4 of Fig. 1.

The drawings show legs 10 mounting a base 12 formed with grooves or ways 14 receiving and slidably mounting flanges 15 of a cam block 16 having a cam surface 17, the block having a tapped hole for receiving the end of an operating screw 18, journalled in a bearing 20, fixed to the base, and having near its end a dial wheel 22 and at its end a hand wheel 24, both wheels being fixed to the screw, so that rotation of wheel 24 causes the screw 18 and wheel 22 to rotate and the cam block 16 to slide, it forming a nut for the screw.

The flat surface of wheel 22 mounts a dial 25. A bracket 26 fixed to bearing 20 has a portion 27 disposed parallel to the wheel 22, near dial 25, and formed with a cutout 28 traversed by a hair line 30 enabling reading of dial 25.

Base 12 mounts a supporting bracket 32 for a reflecting mirror 34 in which may be viewed, from the front of the base 12, the reflection of dial 25 and cutout 28 and hair line 30.

Base 12 also mounts a supporting bracket 36 for an indicator 38 whose dial 40, identical to dial 25, is traversed by a hair line 42, the dial being operatively connected to an actuated element or point 44 engaged by and raised or lowered by cam surface 17 of cam block 16 as the screw 18 is rotated by the hand wheel 24, manipulated by an operator who can view dials 25 and 40 simultaneously, using mirror 34, and compare their positions with respect to the fixed hair lines 30, 42, as the dials rotate under the same force, the movement of screw 18.

In a device that has been made according to the invention hereof, the screw 18 was formed with ten threads per inch, the cam surface 17 was formed with a run to rise ratio of 10, and the indicator 38 was formed to require 360° turn of the screw for a 360° travel of dial 40.

While the indicator shown happens to be of the type wherein the dial rotates relative to a hair line, a different type of indicator could very well be tested, such as one with a stationary dial and a movable pointer. Similarly, whereas hand wheel 22 is shown as mounting a dial which rotates relative to hair line 30, it could very well be the case that the hand wheel might mount a pointer which could move relative to a dial mounted on the stationary bracket 26. A dial moving relative to a stationary hair line forms the full equivalent of a pointer moving relative to a stationary dial.

However, for the purposes of this case I have shown both dials and hair line constructions as identical and have chosen to illustrate an indicator of the type wherein a dial moves relative to a stationary hair line.

It will be observed that the comparator herein shown is so constructed that an operator sitting in front of it may view the indicator 38 and the standard dial 25 simultaneously, manipulating the screw 18 with her right hand on wheel 24. Comparisons at many points of the dial may be made, the operator merely turning the wheel 24 and stopping momentarily as each of the graduations on dial 25 reaches hair line 30 whereupon she may view dial 40 to see if its graduations have reached hair line 42.

It will be observed that in the event that there is a difference between the readings at dial 40 and that at dial 25, and if it is discovered that that difference is due to an error in the screw 18, it not accurately corresponding to cam 17, compensation can be made by altering the angle of cam 17, rather than by rethreading screw 18, the former operation being simpler than the latter. As a matter of fact, the pitch of screw 18 can be any given number, the only requirement being that the angle of cam 17 be related to it in a predetermined proportion, so that the readings on dials 25 and 40 be identical or related in a predetermined proportion.

Now having described the comparator, reference should be had to the claims which follow.

I claim:

1. A comparator for indicators having dials and hair lines and actuated elements, comprising a base, a cam slidably but not rotatably mounted therein, means for supporting an indicator on the base in such a position that its actuated element is engaged by the cam in its sliding movement whereby cam travel is translated, in definite predetermined proportion, into dial indication by dial movement relative to the hair line, a screw threaded into the cam, with the latter forming a nut therefor, a bearing on said base for said screw, a hand wheel on said screw for rotating it and thus causing the cam to slide, a dial fixed to said screw to rotate therewith and formed identical with the dials of the indicators to be mounted on the base, a hair line fixedly mounted on the base, and a mirror mounted on the base to enable an operator to view the relation of the screw mounted dial and its hair line and the relation of the base mounted dial and its hair line, simultaneously for comparison.

2. A comparator for indicators having dials and hair lines and actuated elements, comprising a base, a cam slidably but not rotatably mounted therein, means for supporting an indicator on the base in such a position that its actuated element is engaged by the cam in its sliding movement whereby cam travel is translated, in definite predetermine proportion, into dial indication by dial movement relative to the hair line, a screw threaded into the cam, with the latter forming a nut therefor, a bearing on said base for said screw, a hand wheel on said screw for rotating it and thus causing the cam to slide, a dial fixed to said screw to rotate therewith and formed identical with the dials of the indicators to be mounted on the base, a hair line fixedly mounted on the base, and a mirror mounted on the base to enable an operator to view the relation of the screw mounted dial and its hair line and the relation of the base mounted dial and its hair line, simultaneously for comparison, the axis of the screw being normal to the direction of movement of the actuated element of the indicator mounted on the base.

3. A comparator for indicators having movable elements and stationary elements, whose interrelation is the indicating relation, and actuated elements operatively connected to the movable elements, comprising a base, a cam slidably but not rotatably mounted therein, means for supporting an indicator on the base in such a position that its actuated element is engaged by the cam in its sliding movement whereby cam travel is translated, in definite predetermined proportion, into dial indication by a change in the indicating relation, a screw threaded into the cam, with the latter forming a nut therefor, a bearing on said base for said screw, a hand wheel on said screw for rotating it and thus causing the cam to slide, an indicator having a movable element fixed to said screw to rotate therewith and a stationary element fixedly mounted on the base, the interrelation of these elements being a second indicating relation.

4. A comparator for indicators having movable elements and stationary elements, whose interrelation is the indicating relation, and actuated elements operatively connected to the movable elements comprising a base, a cam slidably but not rotatably mounted therein, means for supporting an indicator on the base in such a position that its actuated element is engaged by the cam in its sliding movement whereby cam travel is translated, in definite predetermined proportion, into dial indication by a change in the indicating relation, a screw threaded into the cam, with the latter forming a nut therefor, a bearing on said base for said screw, a hand wheel on said screw for rotating it and thus causing the cam to slide, an indicator having a movable element fixed to said screw to rotate therewith and a stationary element fixedly mounted on the base, the interrelation of these elements being a second indicating relation, the axis of the screw being normal to the direction of movement of the actuated element of the indicator mounted on the base.

5. A comparator for indicators having movable elements and stationary elements, whose interrelation is the indicating relation, and actuated elements operatively connected to the movable elements, comprising a base, a cam slidably but not rotatably mounted therein, means for supporting an indicator on the base in such a position that its actuated element is engaged by the cam in its sliding movement whereby cam travel is translated, in definite predetermined proportion, into dial indication by a change in the indicating relation, a screw threaded into the cam, with the latter forming a nut therefor, a bearing on said base for said screw, a hand wheel on said screw for rotating it and thus causing the cam to slide, an indicator having a movable element fixed to said screw to rotate therewith and a stationary element fixedly mounted on the base, the interrelation of these elements being a second indicating relation, and a mirror mounted on the base to enable an operator to view the two indicating relations simultaneously for comparison.

6. A comparator for indicators having movable elements and stationary elements, whose interrelation is the indicating relation, and actuated elements operatively connected to the movable elements, comprising a base, a cam slidably but not rotatably mounted therein, means for supporting an indicator on the base in such a position that its actuated element is engaged by the cam in its sliding movement whereby cam travel is translated, in definite predetermined proportion, into dial indication by a change in the indicating relation, a screw threaded into the cam, with the latter forming a nut therefor, a bearing on said base for said screw, a hand wheel on siad screw for rotating it and thus causing the cam to slide, an indicator having a movable element fixed to said screw to rotate therewith and a stationary element fixedly mounted on the base, the interrelation of these elements being a second indicating relation, and a mirror mounted on the base to enable an operator to view the two indicating relations simultaneously for comparison, the axis of the screw being normal to the direction of movement of the actuated element of the indicator mounted on the base.

CLYDE W. CLARK.